United States Patent
Wilkinson

(10) Patent No.: US 9,616,646 B2
(45) Date of Patent: Apr. 11, 2017

(54) METHOD FOR PRODUCING 3-D PRINTED IMAGES

(75) Inventor: Philip Anthony Wilkinson, Crayford (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 1093 days.

(21) Appl. No.: 13/809,748

(22) PCT Filed: Jul. 14, 2011

(86) PCT No.: PCT/EP2011/062106
§ 371 (c)(1),
(2), (4) Date: Feb. 7, 2013

(87) PCT Pub. No.: WO2012/007563
PCT Pub. Date: Jan. 19, 2012

(65) Prior Publication Data
US 2013/0140806 A1 Jun. 6, 2013

Related U.S. Application Data

(60) Provisional application No. 61/364,426, filed on Jul. 15, 2010.

(51) Int. Cl.
| B32B 37/10 | (2006.01) |
| B42D 15/00 | (2006.01) |
| B44F 1/08 | (2006.01) |
| B44F 7/00 | (2006.01) |
| B41M 7/00 | (2006.01) |

(Continued)

(52) U.S. Cl.
CPC ............ *B32B 37/10* (2013.01); *B41M 7/0045* (2013.01); *B41M 7/0054* (2013.01); *B41M 7/02* (2013.01); *B42D 25/00* (2014.10); *B42D 25/29* (2014.10); *B42D 25/425* (2014.10); *B44C 1/20* (2013.01); *B44C 1/24* (2013.01); *B44F 1/08* (2013.01); *B44F 7/00* (2013.01); *B42D 25/455* (2014.10); *B42D 2033/20* (2013.01); *B42D 2035/20* (2013.01); *Y10T 156/109* (2015.01); *Y10T 428/24893* (2015.01)

(58) Field of Classification Search
CPC .... B41M 7/0045; B41M 7/02; B41M 5/0029; B32B 37/10; B32B 27/08; B32B 38/06; B32B 38/14; B44C 1/20; B44C 1/24; B42D 25/00; B42D 25/29; B42D 24/425; B44F 1/08; B44F 7/00
See application file for complete search history.

(56) References Cited

U.S. PATENT DOCUMENTS 5,296,340 A * 3/1994 Tsukada .................. B32B 27/08
101/211
5,573,865 A * 11/1996 Steelman ............. B41M 7/0027
428/200

(Continued)

*Primary Examiner* — Jennifer Simmons
*Assistant Examiner* — Leo T Hinze
(74) *Attorney, Agent, or Firm* — Charles C. Achkar; Ostrolenk Faber LLP

(57) ABSTRACT

A method of producing an apparent etched or embossed effect in a print purely by the use of printing and lamination processes, in which a varnish 3 is pressed into to selected areas of a softer coating 2 to produce indentations in the coating layer 2 as during lamination of a printed article comprising a substrate 1 and an optional overlay 4, and a printed article obtainable using the method.

12 Claims, 4 Drawing Sheets

(51) Int. Cl.
*B41M 7/02* (2006.01)
*B44C 1/20* (2006.01)
*B44C 1/24* (2006.01)
*B42D 25/425* (2014.01)
*B42D 25/29* (2014.01)
*B42D 25/00* (2014.01)
*B42D 25/455* (2014.01)

(56) References Cited

U.S. PATENT DOCUMENTS

| | | | |
|---|---|---|---|
| 6,908,585 B2* | 6/2005 | Wright, Jr. | B44C 1/24 264/447 |
| 2008/0017301 A1* | 1/2008 | Emslander | B41M 5/0256 156/240 |
| 2009/0200791 A1* | 8/2009 | Despland | B44F 7/00 283/85 |

* cited by examiner

METHOD FOR PRODUCING 3-D PRINTED IMAGES

RELATED APPLICATIONS

This application is the National Stage of International Application. No. PCT/EP2011/062106, filed 14 Jul. 2011, which claims benefit of priority to U.S. Provisional Patent Application Ser. No. 61/364,426, filed 15 Jul. 2010, the specification of which is incorporated by reference herein.

BACKGROUND

For some time, it has been known in the art that it is possible to produce a 2-dimensional image that has the appearance of being 3-dimensional when viewed from a single angle, by the use of 4-color printing. The image however, does not change with viewing angle as a true 3-dimensional image would. In recent times, it has been found that realigning magnetic pigment particles by the application during printing of a magnetic field to a wet film of ink containing said particles, can produce an image which changes with viewing angle. This process involves the use of specialized pigments. There are also modifications required to the presses in order to apply the magnetic field to the wet ink film to produce a simulated 3D or etch effect, and if a specific image is required, these modifications can be complicated and expensive.

The following references describe the production of printed images having a 3-D appearance by different means.
   US 2006/0150854A1—Sicpa Holdings
   US 2009/0200791A1—Sicpa Holdings
   US 2007/0172261A1—JDS Uniphase
   US 2003/0165637A1 & U.S. Pat. No. 6,759,097 B2—Flex products
   U.S. Pat. No. 5,223,360A—Merck The references listed above all refer to the production of 3-D images for security or decorative use. They all rely, however, on the use of special magnetic or magnetizable pigments. They also rely on aligning said pigments in a magnetic field, using either permanent or electromagnets. It is the application of the magnetic field which presents the greatest difficulty. If continuous lines are all that is required, it is sufficient to position the magnets somewhere between the printing and drying stages of production. If however, a specific image is required that is specifically placed, the placement and application of the magnets is not so straightforward. The magnets have to be in stationary contact with respect to the print for long enough to develop the image without smearing. Some prior art documents do not address this, others indicate placing the magnets within the impression roller or plate.

SUMMARY OF THE INVENTION

In a first aspect, the present invention provides a process of producing a printed article comprising a substrate and a printed image, the process including the step of applying pressure to a varnish superimposed on selected areas of a coating to press the varnish into the surface of the coating thereby forming the printed image in which the varnish is indented into the surface of the coating. The printed image is advantageously a 3-D image, for example, an image in which the coating has the appearance of having been etched or embossed.

The coating is advantageously softer than the varnish at the temperature at which the step of applying pressure to the varnish in the process of the first aspect of the invention is carried out. As such, the coating is deformed on application of pressure to the varnish such that the varnish becomes indented into the coating. The coating advantageously has a greater plasticity than the varnish at the temperature at which pressure is applied to the varnish. The coating is preferably a thermoplastic material, which softens on heating. The process of the invention optionally further include the step of heating the coating, for example, prior to or during the application of pressure to the varnish. Advantageously, the thermoplastic coating is softened by heating and the varnish is pressed into the softened coating. The varnish is typically either not thermoplastic or softens to a substantially lesser degree than the coating at the temperatures at which pressure is applied to the varnish in the process of the invention.

The printed article advantageously includes an overlay that overlies the coating and the varnish. Typically, the overlay directly overlies, and is in contact with, the varnish. The overlay is preferably harder than the coating at the temperature at which pressure is applied to the varnish. As a result the varnish is pressed into the coating rather than the overlay. The overlay is, advantageously, as hard as or harder than the varnish. It has been found that, due to the differences in thermopasticity between the varnish, the coating and the optional overlay, when the printed coated substrate is heated, for example during a lamination process, the varnish remains relatively hard whereas the coating becomes softer. Accordingly, when pressure is applied to the varnish, the harder varnish produces an indentation in the softer coating layer. As a result, the final printed article has a 3-D effect, for example either an etched or embossed effect.

In a second aspect of the invention there is provided a printed article comprising a substrate and a printed image comprising a coating, typically an opaque coating, and a varnish, typically a transparent varnish, wherein the varnish is indented into the coating. The printed article of the second aspect of the invention is, advantageously, obtained by, or is obtainable by, the process of the first aspect of the invention. Thus, the features described herein with respect to the process of the first aspect of the invention may also be present in the printed article of the second aspect of the invention where appropriate. Similarly, features described herein with respect to the printed article of the second aspect of the invention may also be present in the process of the first aspect of the invention where appropriate. For example, the process of the first aspect of the invention may be a process of producing a laminated printed article, such as a laminated plastic card.

In a third aspect, the present invention provides the use of a printed image comprising a coating and a varnish, wherein the varnish is indented into the coating, as a security feature in a printed article. The printed article of the third aspect of the invention is, advantageously, obtained by, or is obtainable by, the process of the first aspect of the invention. The third aspect of the invention further provides a method of enhancing the security features of a printed article including the step of providing a 3-dimensional image using the process of the first aspect of the invention. The features described herein with respect to the process of the first aspect of the invention or the printed article of the second aspect of the invention may, optionally, be includes in the use of the third aspect of the invention where appropriate.

The present invention uses the physical properties of the inks themselves in novel combination with an established lamination process to produce the image. It is common practice in screen printing to embellish prints with the use of spot varnishing using gloss or matt overprint varnishing. In previously known processes, the varnish is normally deposited onto the print or on top of an overlay to produce areas of differing gloss and does not produce a 3-D effect. In the current invention the varnish is applied under an overlay, if present, and the lamination process is used to develop the finished image. The printed image may be any kind of image including, for example, text, patterns, pictures, designs or logos.

In the present invention, advantageously no additional engineering or modification is required to printing presses in respect to producing the 3-D etched or embossed image. In particular, the process of the invention does not require the application of a magnetic field to obtain the 3-D etched or embossed image. It uses established techniques in a novel combination and the materials used are commercially available and not specially made.

The present invention uses a novel configuration of materials, which are commonly used in printing inks and standard printing and laminating processes, to obtain a 3-D image which changes with viewing angle. The depth of the 3-D image can be also be varied by changes to the film weight (e.g. through the use of coarser or finer printing meshes). The depth of the 3-D effect can further be varied across an individual image by the use of multiple varnish coats.

Typically, the varnish is superimposed on no more than about 95% of the area of the coating on the substrate, for example no more than 90%, such as no more than 80% of the area of the coating on the substrate. Typically the varnish is superimposed on at least about 3% of the area of the coating on the substrate, for example at least about 5%, such as at least 10% of the area. Where an etched effect is required, the varnish is generally applied to a relatively small proportion of the area of the coating on the substrate, for example, from about 3% to about 30%, such as from about 5% to about 25%, of the area of the coating on the substrate. Thus, the majority of the coating remains at a higher level and a smaller proportion of the coating is indented due to the presence of varnish and an etched effect is achieved in the small area of coating that is indented by the varnish. Where an embossed effect is required, the varnish is generally applied to a relatively large proportion of the area of the coating on the substrate, for example from about 50% to about 90%, such as from about 60% to about 80%, of the area. Thus, a small proportion of the coating remains at a higher level and a high proportion of the coating is indented due to the presence of vanish and an embossed effect is achieved in the small area of coating that is not indented by the varnish. The image produced may be described as a "reversed-out" image where, for example, the background is indented and prominent features of the image remain proud of the background and are apparently embossed. The varnish may, optionally, directly overlie and be in contact with the coating or there may, optionally, be one or more intermediate layer, such as a layer of ink between the coating and the varnish.

The process of the first aspect of the invention may, optionally, further include the step of coating the substrate with a coating composition. The process of the first aspect of the invention may, optionally, further include the step of curing the coating composition to form a coated substrate. The curing of the coating may be a drying step, for example when the coating is applied as a solvent based coating composition which cures on removal of the solvent. The coated substrate includes a substrate core and a layer of coating. In one embodiment, the coating composition may not be fully cured until after the varnish has been pressed into the surface of the coating. For example, the coating composition may be partially cured, or fixed, on the substrate, then fully cured, or hardened, once the varnish has been pressed into the coating, for example, in a lamination process.

The process of the first aspect of the invention may, optionally, further include the step of printing a varnish composition over selected areas of the coating. The process of the first aspect of the invention may, optionally, further include the step of curing the varnish. The curing of the varnish may be an irradiation step, for example, where the varnish is applied as a radiation curable varnish composition the varnish composition may be exposed to radiation to form a hardened varnish. The varnish is advantageously fully cured prior to the application of pressure. The varnish is typically cured before the optional overlay is applied. During application of the overlay to the printed coated substrate, the printed coated substrate is typically heated. On heating, the coating, the varnish and the optional coating advantageously soften to differing degrees due to differences in their thermoplasticity. The application of the overlay may occur during the step of applying pressure to the varnish, for example, in a lamination process.

In the present invention, it is possible to vary the depth of the etched or embossed effect by, for example, varying the mesh used for the coating ink and/or the varnish, or by applying multiple coats of varnish. The depth of the varnish however, should preferably be tempered against the ability to effectively cure or dry the varnish film without distorting the substrate. Advantageously, the thickness of the varnish varies on differing areas of the coating. The varnish may, optionally, be applied in two or more layers. The two or more layers of varnish may, optionally, be superimposed on differing areas of the coating on the substrate such that they do not fully overlap. Optionally, different thicknesses of varnish are applied on different areas of the coating. Advantageously, different thicknesses of vanish produce different depths of indentation in the coating following the application of pressure. Thus, the presence of different thicknesses of varnish, advantageously, results in the coating having the appearance of being etched or embossed to differing degrees in different areas of the printed article.

Advantageously, the glass transition temperature ($T_g$) of the varnish is greater than that of the coating. As a result the varnish typically softens to a lesser degree than the coating on heating. The ratio between the $T_g$ of the coating (in °C.) to that of the varnish is typically at least about 1:1.5, for example at least about 1:1.75, especially at least about 1:2. A higher $T_g$ varnish is superimposed in areas where the etch or embossed effect is required. In a preferred embodiment, the $T_g$ of the layer depicting the etched or embossed effect would be greater than the $T_g$ of the underlying area. It should be stressed that although the differential between the component $T_g$ values is important, the differential in hardness at the temperature at which pressure is applied to the varnish, for example the lamination temperature, is the more important factor. As used herein, the term "glass transition temperature" or "$T_g$" refers to the glass transition temperature as determined by differential scanning calorimetry, where the sample is cooled from a temperature above (for example at least 30° K above) the glass transition temperature at a rate of 10° K/minute then heated from a temperature below (for example at least 30° K below) the glass transition temperature at the same rate. The $T_g$ is typically determined from plotting the heat capacity of a substance against the temperature and determining the temperature at which the glass transition endotherm begins on heating, for example, by determining the temperature at which the tangent to the curve prior to the endothem intersects the tangent to the curve during the endotherm. The $T_g$ of the coating is typically less than about 60° C., for example, less than about 50° C., such as less than about 45° C. In one embodiment, the $T_g$ of the coating is less than about 40° C., for example less than about 35° C. The $T_g$ of the coating is typically at least about 15° C., for example at least about 20°. The $T_g$ of the coating is typically in the range of from about 20° C. to about 50° C., for example in the range of from about 23° C. to about 45° C., such as from about 25° C. to about 40° C. The $T_g$ of the varnish is preferably at least about 50° C. or higher, for example at least 55° C., such as at least 60° C. Advantageously, the $T_g$ of the varnish is less than about 150° C., for example less than about 120° C., such as less than about 100° C. A varnish having a $T_g$ in the above ranges, for example in the range of from about 55° C. to about 150° C., has been found to be advantageous for use in the process of the invention as it softens to during lamination process and adheres to the other layers of the 3-D printed article which remaining hard enough to press into the coating and produce indentations with sharp edges.

Both coating and varnish should ideally be thermoplastic in order to maintain or enhance the final lamination bond strength of the printed article, especially where an overlay is included. However, if only small areas are required to be "etched", the thermoplasticity of the varnish layer becomes less essential and in some cases unimportant. In other words, the cured varnish may exhibit no or very little thermoplasticity in some embodiments. For example, in embodiments where relatively small areas of varnish are present and the lack of any appreciable thermoplasticity of the varnish does not materially weaken the lamination bond strength between the optional overlay and the substrate. When compressed under pressure, the varnish presses into the underlying ink causing depressions and also causing a slight realignment of the pigment particles. Under the optional lamination overlay, the varnish is advantageously virtually invisible but the surface is very smooth and flat. This gives the print the appearance of being etched where there is varnish. By using a reversed out image, i.e. where the varnish is applied to the majority of the surface area of the coating, it is possible to produce an embossed effect.

The current invention preferably uses a varnish and a coating of differing thermoplasticity in established operation. Advantageously, an established operation is used without substantial modification or additional engineering, for example using standard coating, printing and lamination techniques, although process modification is possible to enhance the visual effect. Therefore, in a preferred embodiment, there are no additional costs or processing steps involved.

At the temperature at which step of applying pressure to the varnish is performed, the coating is softer, i.e. has a greater plasticity than, the varnish and optional coverlay. Typically, the coating is at a temperature of at least about 100° C. during the step of applying pressure to the varnish, for example a temperature of at least about 120° C., especially a temperature of at least about 130° C. Typically the coating is of a temperature of less than about 200° C., for example a temperature of less than about 160° C. In one embodiment the printed image is a temperature of from about 110° C. to about 180° C., for example a temperature of from about 130° C. to about 150° C. Advantageously, the coating is at a temperature above its glass transition temperature ($T_g$) during application of pressure to the varnish. Typically, the coating is heated prior to, for example immediately prior to, the application of pressure to the varnish.

The coating is at a temperature above its Vicat softening point during application of pressure to the varnish. Advantageously, the substrate is at a temperature above its Vicat softening point during application of pressure to the varnish. Advantageously, the overlay, if present, is at a temperature above its Vicat softening point during application of pressure to the varnish. The varnish may, optionally, be at a temperature above its Vicat softening point during application of pressure to the varnish. Advantageously, the Vicat softening point of the coating is lower than that of the varnish. Advantageously, the Vicat softening point of the coating is lower than that of the optional overlay, if present. Advantageously, the Vicat softening point of the coating is lower than that of the substrate. The pressure is applied to the varnish at a temperature above the Vicat softening point of the coating and, preferably, above the glass transition temperature ($T_g$) of the coating. Advantageously, the pressure is applied to the varnish at a temperature above the Vicat softening point of the substrate. Advantageously, pressure is applied to the varnish at a temperature above the Vicat softening point of the optional coating, if present. Pressure may, optionally, be applied to the varnish at a temperature above the Vicat softening point of the varnish. The Vicat softening point or Vicat hardness is the determination of the softening point for materials that have no definite melting point, such as plastics. The term "Vicat softening point" as used herein refers to temperature (in ° C.) at which a plastics material is penetrated to a depth of 1 mm by a flat-ended needle with a 1 mm$^2$ circular or square cross-section having a load of 10 N (the "Vicat A" test). The ASTM D 1525 standard may be used to determine the Vicat softening point.

The coating may, for example, be formed from a solvent based ink or coating composition. Solvent based inks and coatings are cured on removal of the solvent, for example, in a drying process. The solvent may be an organic solvent or an aqueous solvent. The coating is typically an ink that includes a colorant, for example a pigment, especially a pigment with optically variable properties. The coating applied to the substrate may, for example, be a solid print. The coating is typically opaque. The coating is typically applied to the substrate by screen printing, for example as a solid print. However, other printing methods such as flexographic printing may also be used.

The varnish may, for example, be formed from an energy-curable varnish composition that includes polymerisable components that are cured on exposure of the coating to radiation, such as ultraviolet (UV), infra red (IR) or electron beam (EB) radiation, typically EB or UV, especially UV radiation. For the avoidance of doubt, the varnish composition may also be suitable for use as a coating and the term "varnish composition" and "varnish" is used to distinguish the hard layer of the printed article from the underlying softer layer referred to herein as the "coating" layer. Typically the varnish is a UV curable varnish. The varnish is typically transparent. The varnish may be transparent and colourless (or substantially colourless), or may be transparent and coloured. The process of the invention optionally comprises the step of applying one or more layers of vanish on areas of the coating. The varnish is typically applied by screen printing, flexographic printing, Intaglio printing or ink jet printing, although other printing methods may also be used. The process of the invention may, optionally, comprise the step of curing the varnish, for example, by exposing a radiation-curable varnish composition to radiation.

The printed article of the second aspect of the invention or formed in the process of the first aspect of the invention, typically further comprises an overlay superimposed over the printed image. In the process of the first aspect of the invention, the pressure is optionally applied to the varnish through the overlay. Pressure is typically applied to the overlay to compress the substrate, coating, varnish and overlay together. The overlay is typically transparent, for example transparent and colourless. The overlay may, for example, be applied as a sheet of solid material or may, for example, be applied as a liquid composition which is then hardened, for example, in a curing process. In embodiments in which pressure is applied to the varnish through an overlay that is superimposed on the varnish, the overlay is typically applied as a solid sheet. In embodiments in which the coating is applied over the varnish after the pressure has been applied to the varnish to press it into the coating on the substrate, the overlay may, for example, either be applied as solid sheet, which is then bound to the varnish and the coating in a subsequent lamination step and/or bound via an adhesive, or applied as a liquid composition which is then cured to form a solid overlay. The overlay is typically a plastic material. Suitable plastic materials for the overlay include clear polymers, such as vinyl polymers including polyvinyl chloride (PVC); polyethylene (PE) and ethylene copolymers; acrylic polymers including poly(methyl methacrylate); and transparent polystyrenes. Transparent PVC sheets have been found to be particularly suitable. Preferably the overlay is uncoated, for example, an uncoated plastic material. The overlay may, alternatively, be coated, for example with an adhesive.

In one embodiment of the second aspect of the invention, the printed article is a laminated article further comprising a transparent overlay over the coating, which is typically opaque, and the varnish, the surface of the coating being substantially smooth and the indentations in the coating being visible through the transparent overlay. Optionally, the varnish is also transparent and the indentations in the coating are visible through the transparent overlay and the transparent coating. Advantageously, the overlay and the varnish are indistinguishable or substantially indistinguishable from each other in the finished printed article. As a result the appearance of the coating being etched or embossed is enhanced.

In the process of the first aspect of the invention, pressure is applied to the varnish to press it into the softer coating. Typically, a pressure of at least about 5,000 kPa (50 BAR) is applied to the varnish, for example a pressure of at least about 8,000 kPa (80 BAR) for example at least 10,000 kPa (100 BAR). Typically the pressure will be less than about 50,000 kPa, (500 BAR). Advantageously, a pressure in the range of from about 10,000 kPa (100 BAR) to about 30,000 kPa (300 BAR), for example around 20,000 kPa (200 BAR) is applied, such pressures being typical of the pressures applied in lamination processes used in the plastics card industry. Pressure is typically applied by compressing the substrate, coating and varnish between two platens, between two rollers, such as nip rollers, or between a roller and a platen, preferably between two platens.

Typically, the printed article of the second or third aspects of the invention and/or produced in the first aspect of the invention is a laminated article. Optionally, the pressure is applied to the varnish during a lamination step. For example, on application of pressure, and optionally heat, in a lamination step the substrate, the printed image and the optional overlay become bound to each other and/or to the substrate thereby forming a laminated article. Alternatively a separate lamination step may be employed, if required.

The laminated article may, optionally, include additional layers such as layers of adhesive or additional layers of decoration. For example, the laminated article may include: a substrate; a coating, for example as a solid colour; a transparent varnish over selected areas of the coating; an optional printed image comprising a layer of one or more coloured inks between the coating and a varnish; an optional laminating adhesive that overlies the coating and varnish; and an optional overlay over the entire decorated surface of the article. Lamination of sheet materials using conventional platen type laminators as used in the plastic card industry may be used to apply heat and pressure in the process the invention. However, other laminators, such as for example reel to reel machines having nip rollers, heated or otherwise, to apply pressure to the print and/or laminate may alternatively be used. Advantageously both ink used to form the coating and varnish are suitable for lamination and will give a bond strength of 2.0 Newtons/cm or greater, for example 3.5 Newtons/cm or greater. ISO7810 specifies 3.5 Newtons/cm as a minimum figure for lamination bond strength, though in practice, the majority of card converters demand far in excess of this to guarantee card integrity.

A typical lamination procedure, for example used in the production of credit-cards and the like involves the following steps: (1) the components are held together under light pressure, for example, between polished meal plates; (2) the components are heated until they soften enough to start to bond together; (3) optionally, the components are cooled until they start to solidify again; and (4) the pressure is increased to push all the components together and produce the smooth outer surface. The process of the first aspect of the invention may be performed during such a lamination procedure, for example, the step of applying pressure to the varnish may be carried out in step (4) of a lamination procedure.

In one embodiment, a solvent-based laminating ink was used in combination with a UV-curing laminating varnish, the solvent-based ink having a low glass transition point ($T_g$) and high thermoplasticity, and the UV-curing varnish having a higher ($T_g$) and lower thermoplasticity. While both ink and varnish will tend to distort during the lamination process, there will be a greater softening of the ink allowing the varnish to push into it.

The substrate is typically a sheet of generally flat solid material. Alternatively, the substrate may be a shaped article, especially a shaped article that is suitable for lamination. The substrate may, for example, be constructed of a plastics material such as a laminated plastics material, card or stiff paper, metal such as aluminum, glass, cellulose or carbon fibre. The substrate may, optionally, have some degree of flexibility and is preferably not entirely rigid. Plastics materials, in particular laminated plastics materials are typically the preferred substrate. Suitable plastics materials for the substrate include polyvinyl chloride (PVC), polyester (e.g. PETg) or polycarbonate. Whilst the use of plastic substrates such as PVC, polyester, etc. as the core material has been described in various embodiments of the invention, alternative substrates including papers; metals; cellulosic materials; and composite substrates may also be used in the process of the first aspect of the invention. The substrate is advantageously suitable for lamination at elevated temperatures, such as for example a temperature of at least 130° C. especially a temperature of 150° C. or more. The substrate can be coloured, if required, or can be printed with a based coat of any desired colour. The thermoplastic coating may cover the entire surface of the substrate or may only be present in certain area(s). In one embodiment, the substrate is a credit-card sized sheet, for example a plastic sheet.

The printed article of the invention is typically planar. The planar particle may be generally rectangular, for example rectangular with rounded corners, or other shapes such as circular or square. The printed article may be a credit card-like article, for example having dimensions of 7 to 10 cm long×4 to 6.5 cm wide×0.4 cm to 0.01 cm deep, such as from 8 to 9 cm long×5 to 6 cm wide×0.25 cm to 0.05 cm deep. The shape and size of a credit card is specified by the ISO/IEC 7810 standard as ID-1 to be 85.60 mm long×53.98 mm wide and the printed article of the present invention may have those dimensions or approximately those dimensions, for example to within 5 mm especially to within 1 mm. Credit card-like articles include, for example, business cards, promotional cards and fliers; store cards, loyalty cards, discount cards, gift cards and bonus cards; bank cards, cheque guarantee cards, debit cards and credit cards; smart cards, security passes, identification cards and membership cards; and the like. Such credit card-like articles are typically referred to in the industry as "laminated plastic cards" or simply as "plastic cards". In one embodiment, the printed article is a plastic card.

The printed article of the invention may, alternatively, be non-planar. Thus, whilst in a preferred embodiment, the inventive process may, for example, be used in the production of plastic cards such as credit and debit cards; membership cards; gift cards; ID cards etc., but there could also be uses in any application which involves a heat and pressure lamination process. It is envisaged that items such as automotive fascia panels; decorative kitchen work surfaces; items of furniture; even false fingernails, et al could be visually enhanced using this method.

Typically, screen printing process may be used to produce both the coating and varnish images. However, successful tests have shown that it is also possible to replicate the effect using screen printing of the coating in combination with Flexographic printing of the varnish; in combination with UV inkjet printing of the varnish; and in combination with Intaglio printing of the varnish. Tests were also successful when using the Flexographic process to print both coating and varnish. Based on these results it is anticipated that any printing process can be used to replicate the effect provided that sufficient coating weight can be achieved, either by single or multiple coats, and that the thermoplasticity and constituent criteria can be met. For example, it is further anticipated that roller coating techniques can also be used to produce the effect The surface of the article produced by the process of the first aspect of the invention is typically smooth with the variations in the depth of the coating occurring within the article. The use of overlay has been found to be particularly suitable in order to produce a printed article with a smooth surface. In one embodiment, the printed article is a laminated article comprising a transparent overlay over the coating and the varnish, the surface of the coating being substantially smooth and the indentations in the coating being visible through the overlay and the varnish. A press polish technique may also or additionally be used in the process of the invention, for example, to produce the simulated etched or embossed image. Press polishing is a technique where no overlay is used in the lamination process, and the steel lamination plates polish the ink or varnish surface itself. In this case both the solvent based ink and the UV varnish must be suitable for the press polishing process.

The coating advantageously comprises particles of pigment having optically variable properties and/or decorative effect pigments. Advantageously, the coating comprises a pigment with optically variable properties. A pigment with optically variable properties produces a different effect, for example appears different to an observer, depending on the angle from which the pigment particles are observed and/or the angle of incident light falling on the pigment particles. A pigment which reflects a different brightness and/or colour dependent on the incident or observed angle is preferred.

Advantageously, the coating comprises laminar particles. The presence of laminar particles advantageously provides optical variable properties to the coating, for example, when the alignment of the laminar particles differs in a first area of the coating compared with a second area of the coating, the optical properties of the coating differ in the first and second areas. The laminar particles have a minimum dimension substantially less, for example at least 10 or at least 20 times less, than the maximum dimension. Such laminar particles therefore have a high aspect ratio. The laminar particles may be in a strip from, with two small dimensions and one large dimension, or in a platelet form with two large dimensions and one small dimension. Platelets are generally preferred. Examples of laminar particles include platelet pigments, such as flake aluminum pigment, large particle mica, or any other pigment having optically variable properties. The pigment types used within the ink contribute to the final appearance of the etched or embossed image and if they meet certain criteria, e.g. they comprises laminar particles, an enhanced effect may be produced. Various laminar particles, especially various platelet particles, have been found to be particularly suitable for use in the invention due to their ability to reflect a different brightness and/or colour dependent on the angle of incident light or observed angle.

Suitable pigments for use in the coatings include aluminium pigments, or pastes thereof, of the leafing variety having a "silver dollar" or "cornflake" particle profile, specific examples being eternabrite Premier 1752 and Sparkle Silver 3622 from Silberline; Nacreous or pearlescent pigments having a platelet structure, including those which have been treated or doped so that they can change appearance dependent on viewing angle, sometimes termed as having significant colour travel, specific examples being the Colorstream range from Merck and the Sun Prizma range from Sun Chemical; and Liquid Crystal pigments with a wide colour travel range and a flat plate-like structure, such as the Helicone range from LCP Technologies.

In one embodiment, the present invention provides a method of producing a simulated etched or embossed print wherein a solid print of a low $T_g$, thermoplastic, ink containing flake aluminum pigment, large particle mica, or in fact any pigment having optically variable properties, is printed onto a core material and dried.

Optionally, decorative effect pigments are included in the varnish composition, such as micas and holographic pigments. The inclusion of such pigments within the varnish advantageously enhances the appeal of the finished articles (e.g. gift cards, credit cards, etc.).

In the current invention the pigment particles within the solvent based ink of the coating lie flat, for example, at or near to the surface after printing, but are realigned during lamination by the action of the UV varnish being pushed into the ink surface. This is specifically true at or near the margins of the varnished area and consequently changes the incident angle of light hitting those areas through the transparent UV varnish. The viewing angle is also changed for the observer in these areas, thus enhancing the 3-dimensional appearance. Thus, the process of the first aspect of the invention provides a process in which the alignment of pigment particles in a solvent based ink used as a coating is controlled without the application of a magnetic field. Therefore, the invention advantageously provides process of producing an apparent 3-D etched image without the application of a magnetic field and a process of producing an apparent 3-D embossed image without the application of a magnetic field.

In the third aspect of the invention, the printed image is used as a security feature in a printed article, for example, in a printed article of the second aspect of the invention. Advantageously, the printed image is used as a security feature in a printed article which is a laminated article comprising a transparent overlay over the coating and the varnish, the surface of the coating being substantially smooth. The laminated article may, for example, be a plastic card. The printed image may, optionally, be used to provide an overt security feature which is immediately apparent. The printed image may, optionally, be used to provide a covert security feature which is only apparent to the trained observer and/or requires special techniques to be employed in order for the printed image to become apparent. The printed image may be used to provide both a covert and overt security feature and include a combination of covert and overt features. The security feature may, for example, be used as a deterrent to unauthorized reproduction of the printed article or to indicate that the printed article is genuine. The inclusion of pigments having optically variable properties in the coating has been found to be particularly advantageous in providing security features to a printed article. Whilst in principle the method is simple to replicate, the use of restricted security pigments or covert taggants within the ink or varnish used may render it suitable as an additional security feature.

The coating and/or the varnish, especially the coating, optionally comprises particles of pigment having covert taggants, such as, organic or inorganic covert taggants. Advantageously, restricted security pigments or taggants are used in the inks used to form the coating in the process of the invention, such as for example licensed mica pigments; secure optically variable pigments; ultraviolet (UV) fluorescing pigments, such as phosphors and doped phosphors; infrared (IR), especially near IR, absorbing organic or inorganic agents; IR, especially near IR, emitting organic or inorganic agents; IR fluorescing agents; or RFID devices. The restricted security pigments or taggants present in the coating may advantageously have optically variable properties and may, for example, have a platelet structure. The presence of within the ink may provide an overt or covert security feature in plastic cards or documents produced in this manner. Optionally, covert taggants are included in the varnish composition, such as for example IR absorbers; IR fluorescing agents; and UV fluorescing pigments, such as doped phosphors. The inclusion of such taggants within the varnish advantageously enables use as a security feature.

The present invention provides a method of producing a 3-dimensional image in a laminated plastic film. In particular a method of producing an apparent embossed or etched image in a laminated plastic film. Advantageously, the image is formed by indenting a varnish into the surface of a coating. Advantageously, the method of producing the image uses current commercially available materials. Advantageously, the method of producing an image involves the use of currently used printing and laminating techniques. The method of the invention may, for example, be used to produce a plastic card such as a credit/debit card or gift/membership card. In one embodiment, the invention provides a method of producing a secure plastic card such as a credit/debit card using a restricted security pigment or taggants within the ink coating or varnish. Advantageously, the method of the invention enables a 3-dimensional image to be produced without the application of a magnetic field. The ink of the coating optionally includes a decorative effect pigment. The invention further provides a method of producing a 3-dimensional image in a decorative surface. The present invention may, for example, be used to produce an identification card. In one embodiment, the image is produced using a press polishing technique. The method of the invention advantageously produces a variable depth of apparent etch across and within a single image and/or a variable depth of apparent embossing across and within a single image.

Advantageously, neither special pigments nor equipment are required in order to produce a 3-D image using the method of the present invention. In the prior art if there is a need to change the required 3-D image, the magnets would also need to be realigned or changed. This could be fairly simple for a limited number of designs, but may be difficult and expensive if regular changes are envisaged. The current invention would only require a change of printed image design (e.g. stencil or screen) to facilitate a change of design.

DETAILED DESCRIPTION OF THE INVENTION

Figure 1:
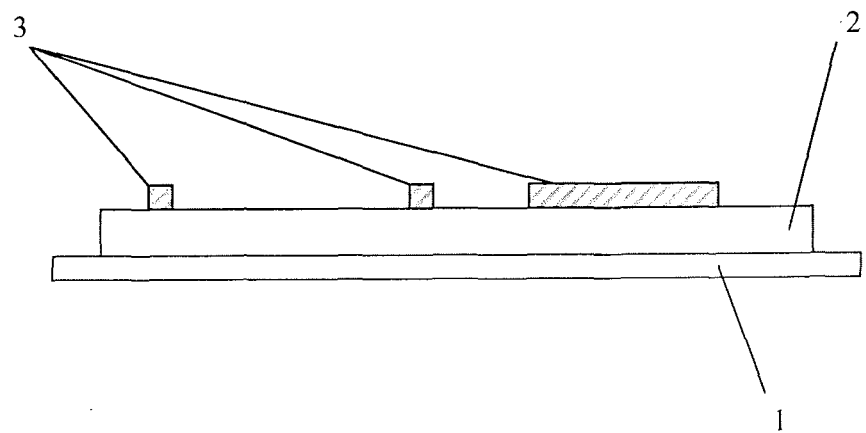
FIG. 1: Shows a print of a first embodiment of the invention before lamination.
Figure 2:
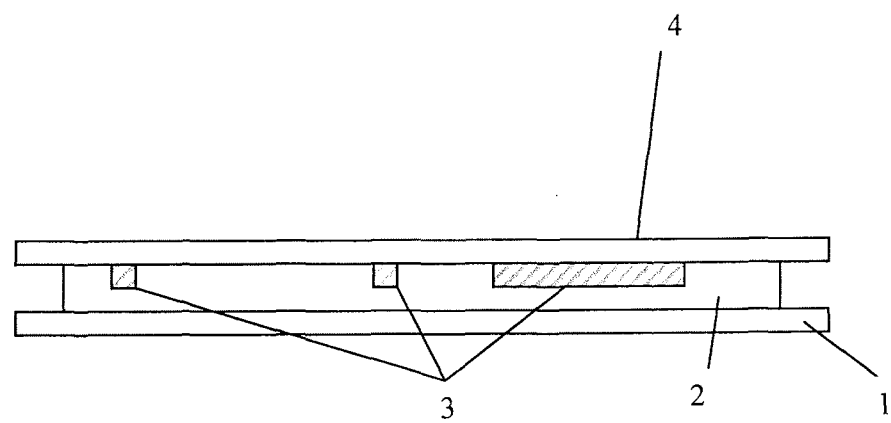
FIG. 2: Shows the print of FIG. 1 after lamination.

In a first embodiment of the invention the coating is formed from a solid print of metallic solvent-based ink into which a less thermoplastic, higher $T_g$, transparent varnish is pressed on lamination to form indentations in the coating. As a result, in the finished laminated article the solid print has the appearance of having been etched in the areas where the varnish is present. FIG. 1 shows a print of the first embodiment of the invention prior to lamination in which a cured solid print of a solvent-based metallic ink printed onto PVC core plastic material substrate 1 forms a coating 2 onto which a UV-curing varnish print 3 has been applied. The varnish 3 has been applied where the "etch effect" is required. FIG. 2 shows the same print as that of FIG. 1 after an operation in which clear overlay 4 has been applied over the surface of the print. As can be seen, the UV varnish 3 has been pushed into the ink film leaving indentations. The UV varnish 3, being transparent and colourless, is virtually invisible under the clear overlay 4.

Figure 3:
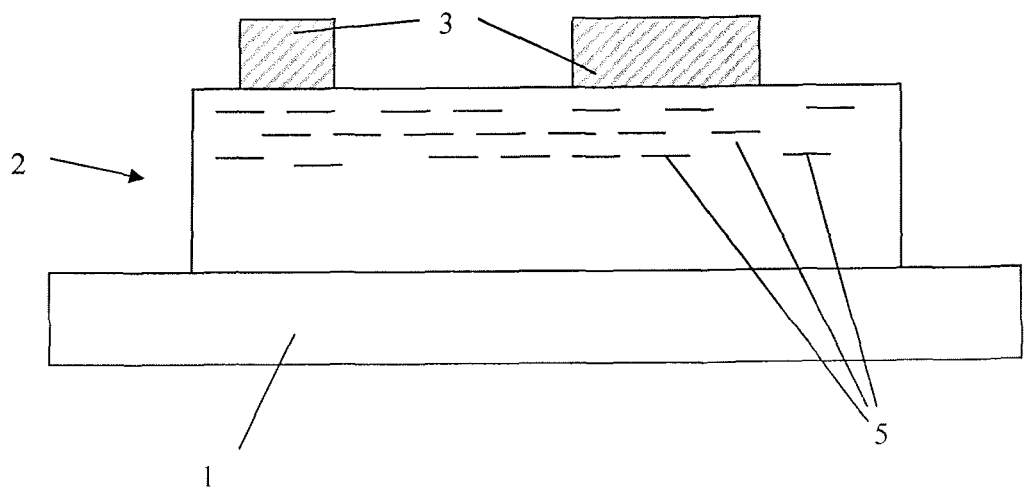
FIG. 3: Shows a print of a second embodiment of the invention before lamination.
Figure 4:
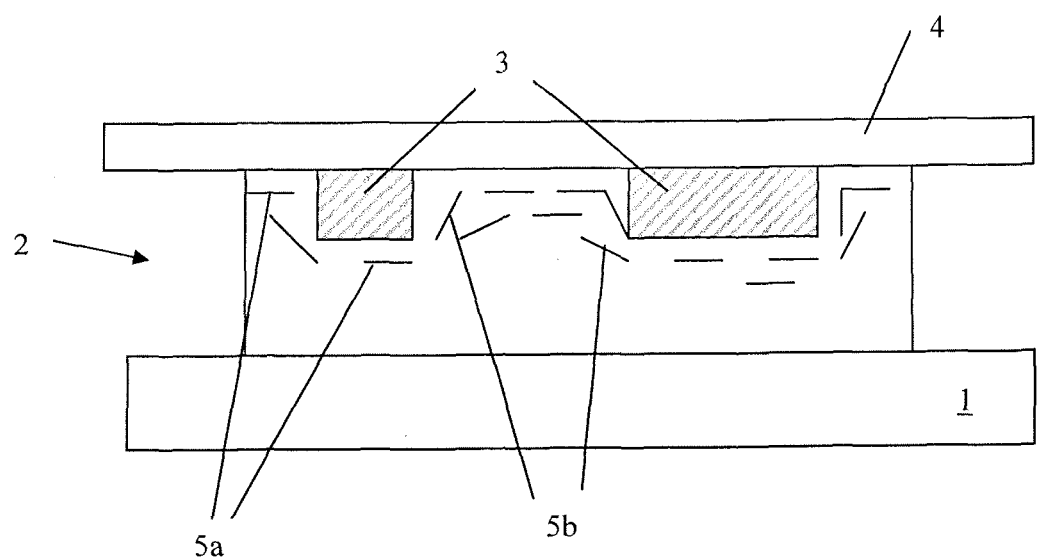
FIG. 4: Shows the print of FIG. 3 after lamination.

In a second embodiment, the ink used to form the coating includes aluminum or mica particles. FIG. 3 shows a coating 2 formed from a solid print of a solvent-based ink containing aluminum or mica particles 5. The particles 5 are generally aligned parallel to the core substrate 1, as would normally be expected in a dried ink film. FIG. 4 shows the orientation of the aluminum or mica particles 5 in the coating 2 of the second embodiment after lamination and following pressing of the varnish 3 into the softer coating 2. Whilst those particles 5a that are remote from the parts of the coating that have been deformed by the film remain aligned in the normal orientation, some of the particles 5b have been realigned by the deformation of the coating 2 to follow the new surface contours. Particles of different orientation reflect light in different directions resulting in the optical effect of the coating being different in different parts of the laminated article.

Figure 5:
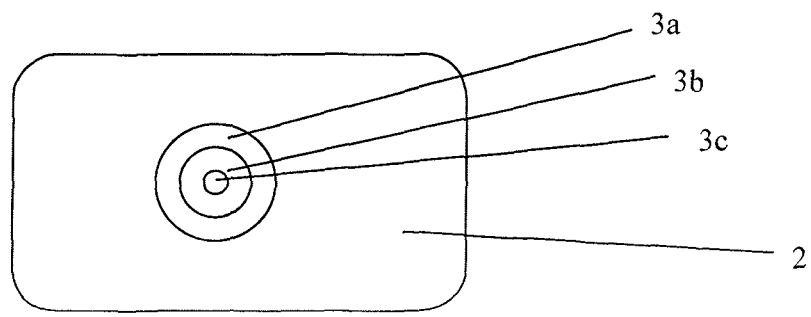
FIG. 5: Shows a plan view of print of a third embodiment of the invention before lamination.
Figure 6:
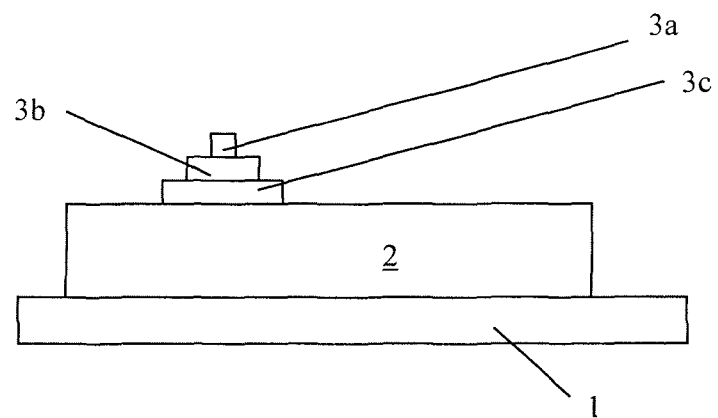
FIG. 6: Shows a cross-section of the print of FIG. 5, again before lamination.
Figure 7:
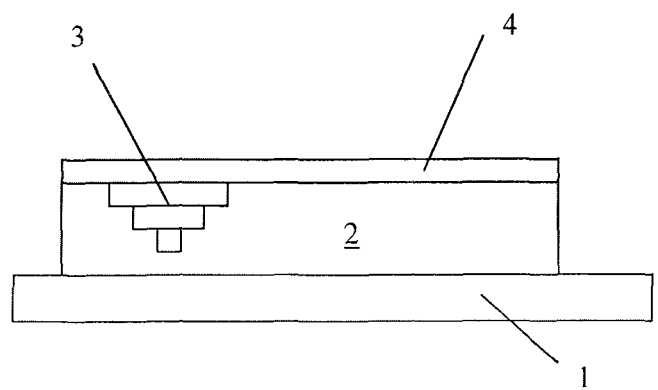
FIG. 7: Shows a cross-sectional view of the prints of FIGS. 5 and 6 after lamination.

In a third embodiment, multiple layers of varnish are overlaid on a coating in order to produce areas where the coating has the appearance of having been etched to varying degrees. FIG. 5 shows a plan view of the multiple coats 3a, 3b and 3c of UV varnish 3, printed over coating 2 formed from a solvent-based ink as circles of decreasing size, all centered at the same point on the underlying print, before lamination. FIG. 6 shows a cross-section of the print of the third embodiment, again before lamination. Varnish layer 3a was applied to the coating 2 first by a screen printing technique and then overlaid with varnish layer 3b followed by varnish layer 3c. On application of the overlay 4 and lamination the varnish 3 is pressed into the coating 2, the depth of indentation depending on the number of layers of varnish applied as can be seen in the cross sectional view of FIG. 7. It can be clearly seen that the depth of "etch" increases with varnish film thickness and can be varied within a print.

In one embodiment, a low $T_g$, thermoplastic, solvent-based ink containing aluminum or mica particles is screen printed through a mesh, preferably having between 43 and 90 threads per cm onto core material substrate. This core material can be for example PVC, PETg (polyester) or polycarbonate and would, preferably, be suitable for lamination at elevated temperatures, such as for example between 130 and 150° C. The plastic core can be colored if required, or can be printed with a base coat of any desired colour. The substrate is then printed with the coating. In the case of mica-based ink it is preferable to have a base color, and more preferably it would be black. Base coat and metallic/mica ink would preferably be thoroughly dried, and can be processed immediately when dry or stored for subsequent use. Next, a higher $T_g$ lamination UV-curing varnish is printed over the ink in areas which correspond to those required to be "etched". In the case of simulated embossing, the areas of the coating not requiring embossing are overprinted with the varnish and the areas that are to remain proud are left unprinted with varnish. It is preferable that both the ink used to form the coating and the varnish are suitable for lamination and will give a bond strength equal to or greater than the ISO standard for plastic cards. ISO7810 specifies 3.5 Newtons/cm as a minimum figure for lamination bond strength, though in practice, the majority of card converters demand far in excess of this to guarantee card integrity. In specific tests, the ink used to prepare the coating was a solvent-based laminating ink containing aluminum flake pigment or a mica pigment having a pearlescent or optically variable nature. The varnish used in specific tests was a UV-curing lamination varnish, though it is envisaged that other drying mechanisms such as EB; IR; and even jet air are viable provided the thermoplasticity criteria are met.

In one embodiment, the printed article of the invention includes, as a substrate, a backing sheet of core material collated with two sheets of uncoated PVC overlay. The use of a backing sheet of core material assumes that the resultant card will be of twin core construction. The current invention will work equally well on single or multiple core card construction. It is envisaged that the method could be applied to both card surfaces and could even have the same image on either face, one embossed and the other etched. The core is printed with an ink to form a coating and then overprinted with a varnish being sandwiched between the overlay sheets. The collated sheets are then laminated under heat and pressure. The temperature should preferably be between 130 and 150° C., the time and pressure are dependent on the particular equipment used, but should be sufficient to achieve a good bond. On removal from the laminator, it will be seen that the varnish layer has been pushed into the ink layer causing indentations. Being transparent, the varnish will fill the apparent voids in the ink film (i.e. the indentation in the coating) and the overlay will give the whole a flat smooth surface. It will appear that areas of the solid ink film of the coating have been etched away. The effect is particularly marked where colourless, transparent varnishes are used as the presence of the varnish will not be easily discernable. The thermoplastic nature of the coating assists in allowing the varnish to deform its surface. The varnish is preferably much less thermoplastic and consequently maintains its cure shape during the process. This helps to give a crisp outline to the "etched" image. The presence of optically variable particles of aluminium or mica in the ink further enhances the 3-D effect, in that they will be physically realigned as the varnish layer pushes into the ink layer and will naturally follow the shape of the "etched/embossed" area.

By printing the varnish in a reversed out image, that is, by printing the background and leaving the areas of the image that are required to stand proud of the background unprinted, the lamination process produces an apparent embossed image.

The present invention has been described in detail, including the preferred embodiments thereof. However, it will be appreciated that those skilled in the art, upon consideration of the present disclosure, may make modifications and/or improvements on this invention that fall within the scope and spirit of the invention. It is to be understood that features described as being present in certain embodiments of the invention may also be present in other embodiments where appropriate.

EXAMPLES

The following examples illustrate specific aspects of the present invention and are not intended to limit the scope thereof in any respect and should not be so construed.

Example 1

A solvent-based Vinyl/Acrylic-based metallic laminating screen ink was produced by mixing CCB Bronze Binder from Sun Chemical (90%) with a solvent damped aluminum paste such as Eternabrite premier 1752 from Silberline (10%). This ink was printed as a solid area through a 77 threads/cm screen mesh onto 320 micron PVC core material, as supplied by Klockner Pentaplast for the manufacture of plastic cards and the solvent removed to form a coating having a $T_g$ of about 30.7° C. A UV-curing varnish composition such as Solarsmart from Sun Chemical was screen printed over the metallic ink through a 120 threads/cm mesh in a particular pattern and fully cured to form a varnish having a $T_g$ of about 65° C. The print was collated in the standard manner for plastic card manufacture (i.e. print+ backing sheet+clear overlay) and laminated at 140° C. using an Oasys desktop laminator and standard time and pressure settings. It was seen that the lamination process had pushed the UV-curing varnish into the solvent-based metallic ink causing indentations, giving 3 dimensional image.

Example 2

As Example 1 above, but replacing the aluminum paste with 15% mica-based pigment such as Colourstream Arctic Fire from Merck pigments. The CCB Bronze Binder content was reduced to 85% to incorporate the extra pigment. Also, the mica ink is printed over a black background produced by printing CC/NT-N50 black from Sun Chemical through a 90 threads/cm screen mesh to form a coating having a $T_g$ of about 26.7° C.

Example 3

A solvent based acrylic/vinyl screen ink as described in Example 1 was printed in solid area onto 320 micron core PVC, using the procedure and specification described in Example 1 above. This coat was allowed to thoroughly dry by natural means or by application of hot air. A UV curing inkjet varnish composition such as U7315 from Sun Chemical, was then applied over the solvent based ink using a UV inkjet printer such as DMP-2800 series, in several passes (3-5 passes were found to give sufficient coating weight) in a particular pattern and cured. The completed print was then laminated at 140° C. using uncoated overlay and it was seen that the varnished areas were pushed into the screen ink as described in Examples 1 and 2, producing a simulated etch pattern where varnish was present.

Example 4

A solvent based acrylic/vinyl screen ink was produced printed and dried as described in Example 1 above. A UV curing laminatable varnish composition based on an acrylic/vinyl combination, such as Solarsmart from Sun Chemical, was applied using a laboratory hand flexographic proofer with a 140 line anilox roller, to half of the screen print and cured. A further coat was then similarly applied, slightly offset from the first to form two "steps". When this was laminated as previously described the resultant print has two "etched" steps, the area with two coats appearing to be etched deeper than the single coat.

Example 5

The solvent based acrylic/vinyl screen ink described in Example 1 above was reduced to a suitable viscosity (approximately 32 seconds Zahn 2 cup) and applied to 320 micron core PVC in 2 coats using a hand flexographic proofer with a 140 line anilox roller. These coats were both thoroughly dried by solvent evaporation. The UV curing laminatable varnish composition also described in Example 1 was applied over a section of the solvent based print using a flexographic proofer, again in multiple stepped coats, each coat being cured individually to provide a varnish layer having a $T_g$ of about 65° C. The completed print was then laminated as previously described. It was seen that the varnished areas have been pushed into the underlying ink producing an etched effect.

Example 6

A solvent based acrylic/vinyl screen ink was printed and dried as in Example 1 above. A UV curing Intaglio varnish based on Polyester, Styrene Maleic anhydride and Acrylic oligomer, was applied using the Intaglio printing process in a guilloche pattern over the screen print. When laminated as previously described the guilloche pattern was apparently etched into the screen ink.

The invention claimed is:

1. A process of producing a printed article comprising a substrate and a printed image, the process including the step of applying pressure to a varnish superimposed on selected areas of a coating on the substrate to press the varnish into the surface of the coating thereby forming the printed image in which the varnish is indented into the surface of the coating on the substrate; wherein the coating is thermoplastic and is heated prior to or during the application of pressure to the varnish; and wherein the coating and varnish have glass transition temperatures (Tg), in ° C., in the ratio of at least 1:1.5.

2. The process of claim 1, wherein the coating on the substrate is at a temperature higher than its glass transition temperature (Tg) during the application of pressure to the varnish.

3. The process of claim 1, wherein the varnish is pressed into the surface of the coating on the substrate to form an etched or embossed image.

4. The process of claim 1, wherein the varnish is superimposed on no more than about 90% of the area of the coating on the substrate.

5. The process of claim 1, wherein the thickness of the varnish varies on different areas of the coating on the substrate.

6. The process of claim 1, wherein the varnish is formed from a radiation-curable composition.

7. The process of claim 1, wherein the coating is formed from a solvent-based composition.

8. The process of claim 1, wherein the coating comprises particles of pigment having optically variable properties.

9. The process of claim 8, wherein the particles of pigment having optically variable properties have a platelet structure.

10. The process of claim 1, wherein there is an overlay over the varnish and coating on the substrate, and pressure is applied to the varnish through the overlay.

11. The process of claim 1, wherein the step of applying pressure to the varnish is a lamination step.

12. The process of claim 1, wherein:
the coating is a printed thermoplastic coating layer that has greater plasticity than the varnish at the temperature at which the pressure is applied; and
the coating comprises laminar particles.

* * * * *